US006982834B2

(12) United States Patent
Sato

(10) Patent No.: US 6,982,834 B2
(45) Date of Patent: Jan. 3, 2006

(54) WIDE-ANGLE ZOOM LENS INCLUDING AT LEAST ONE ASPHERIC LENS SURFACE

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 45 days.

(21) Appl. No.: 10/936,750

(22) Filed: Sep. 9, 2004

(65) Prior Publication Data

US 2005/0057816 A1 Mar. 17, 2005

(30) Foreign Application Priority Data

Sep. 11, 2003 (JP) ............................ 2003-320120

(51) Int. Cl.
*G02B 15/14* (2006.01)

(52) U.S. Cl. ...................... 359/682; 359/691; 359/717; 359/708; 359/689; 359/686; 359/793; 359/754; 359/680

(58) Field of Classification Search ................ 359/680, 359/682, 691, 717, 708, 689, 686, 793, 754
See application file for complete search history.

(56) References Cited

U.S. PATENT DOCUMENTS

| | | | |
|---|---|---|---|
| 6,351,337 B1 | 2/2002 | Tanaka | |
| 6,498,687 B1 | 12/2002 | Sekita et al. | |
| 6,545,819 B1 | 4/2003 | Nanba et al. | |
| 6,735,020 B2 * | 5/2004 | Sekita | 359/682 |
| 6,771,433 B2 | 8/2004 | Ohashi | |
| 2004/0095654 A1 * | 5/2004 | Watanabe | 359/689 |

FOREIGN PATENT DOCUMENTS

| | | |
|---|---|---|
| JP | 2000-284177 | 10/2000 |
| JP | 2001-296476 | 10/2001 |
| JP | 2003-35868 | 2/2003 |

OTHER PUBLICATIONS

English Abstract attached.

* cited by examiner

*Primary Examiner*—Evelyn A. Lester
(74) *Attorney, Agent, or Firm*—Arnold International; Jon W. Henry; Bruce Y. Arnold

(57) ABSTRACT

A three-group zoom lens includes first, second, and third lens groups, of negative, positive, and positive refractive power, respectively. The second lens group includes a stop and the third lens group moves for focusing. When zooming from the wide-angle end to the telephoto end, the first and second lens groups become closer together and the second and third lens groups become farther apart. The zoom lens preferably satisfies specified conditions that ensure compactness, case of manufacture, and favorable correction of aberrations. The zoom lens includes at least one aspheric lens surface defined by an aspheric lens equation that includes at least one non-zero coefficient of an even power of Y, and at least one non-zero coefficient of an odd power of Y, where Y is the distance of a point on the aspheric lens surface from the optical axis.

20 Claims, 4 Drawing Sheets

WIDE-ANGLE ZOOM LENS INCLUDING AT LEAST ONE ASPHERIC LENS SURFACE

BACKGROUND OF THE INVENTION

Currently, zoom lenses for various cameras are formed, for example, of three-group construction and include, in order from the object side, a first lens group of negative refractive power, a second lens group of positive refractive power, and a third lens group of positive refractive power. Zoom lenses with this construction have been widely used in order to produce a compact zoom lens with good correction of aberrations. Additionally, for digital cameras and video cameras that have been widely used in recent years, as with zoom lenses for camera use in general, a small lens that enables high picture quality and low distortion is desired. Additionally, it is necessary to satisfy particular conditions due to the use of a solid state image pickup element, such as a CCD.

Recently, in these digital cameras and video cameras where a solid state image pickup element, such as a CCD, is used, the demand for a wider angle of view in the lens has become extremely strong. For example, there is a demand for a zoom lens in a thirty-five millimeter format camera to have a wide-angle focal length of approximately twenty-eight millimeters to twenty-four millimeters.

In a camera where a solid state image pickup device is used, it is possible to process an imaged picture into different pictures. This image processing, including image enlargement and cropping of an image taken at a wider angle, enables producing an image that simulates an image taken at the telephoto end to some extent. However, it is difficult to simulate a picture taken at a wide-angle from an image taken at the telephoto end. Therefore, it is necessary to optically obtain pictures at the wide-angle end.

Japanese Laid-Open Patent Application 2003-035868 discloses zoom lenses designed for satisfying the requirements discussed above. The zoom lenses described in Japanese Laid-Open Patent Application 2003-035868 are mountable on a digital camera or a video camera where a solid state image pickup device, such as a CCD, is used. These zoom lenses have a three-group construction, wherein it is possible to zoom in and out within the range of focal lengths of twenty-six to eighty millimeters in terms of a thirty-five millimeter format camera.

However, in the zoom lenses described in Japanese Laid-Open Patent Application 2003-035868, the first lens group is formed of three lens components that are lens elements so that it is difficult to satisfy the demands of compactness, which are currently strong for digital cameras and video cameras. In other words, in order to satisfy the above requirements, the requirement of obtaining excellent optical performance at the wide-angle end has resulted in acceptance of a requirement of a minimum of three lens elements that are lens components of the object-side lens group, and using only two lens elements or lens components for this lens group, which would provide desired greater compactness, has been assumed to result in an unacceptable optical performance, including unacceptable lateral color, spherical aberration, distortion, and/or image surface curvature, which is also known as field curvature or curvature of field.

BRIEF SUMMARY OF THE INVENTION

The present invention relates to zoom lenses of simple construction with an object side lens group including two lens components, which may be lens elements, with a large wide-angle view, and with excellent correction of lateral color aberration, spherical aberration, distortion, and image surface curvature, even at an increased wide-angle end. The present invention further relates to such a zoom lens particularly suited for mounting in a digital camera or video camera that uses a solid state image pickup element, such as a CCD, and that is compact while providing a large wide-angle view.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
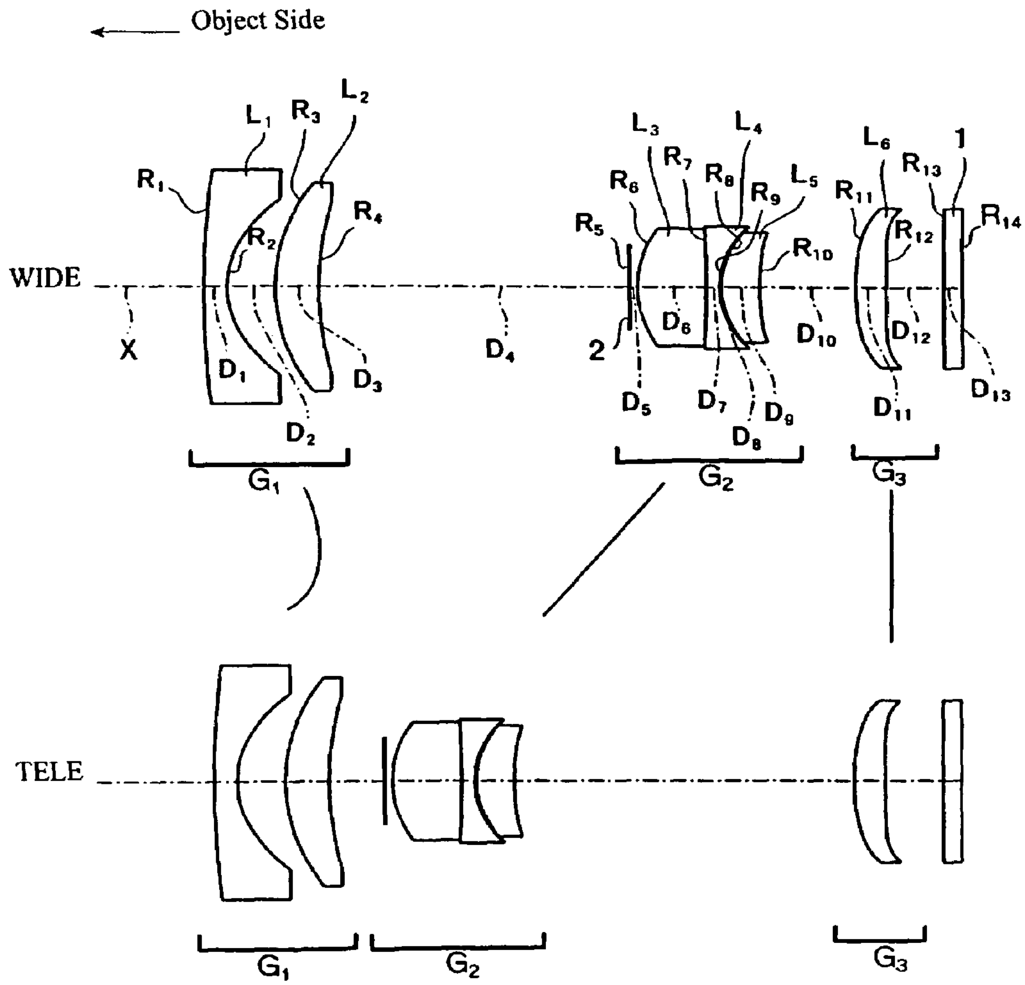
FIG. 1 shows cross-sectional views of the zoom lens according to Embodiment 1 at the wide-angle end (WIDE) and at the telephoto end (TELE)

A general description of the three-group zoom lens of the present invention that pertains to the two disclosed embodiments of the invention will first be described with reference to FIG. 1 that shows Embodiment 1. In FIG. 1, lens elements are referenced by the letter L with a subscript denoting their order from the object side of the zoom lens along the optical axis X, from $L_1$ to $L_6$. Similarly, radii of curvature of the optical surfaces are referenced by the letter R with a subscript denoting their order from the object side of the zoom lens, from $R_1$ to $R_{14}$. The on-axis surface spacings along the optical axis X of various optical surfaces are referenced by the letter D with a subscript denoting their order from the object side of the zoom lens, from $D_1$ to $D_{13}$. In the same manner, the three groups are labeled $G_1$ to $G_3$ in order from the object side of the zoom lens and the lens elements belonging to each lens group are indicated by brackets adjacent the labels $G_1$ to $G_3$.

The term “lens group” is defined in terms of “lens elements” and “lens components” as explained herein. The term “lens element” is herein defined as a single transparent mass of refractive material having two opposed refracting surfaces that are oriented at least generally transverse to the optical axis of the zoom lens. The term “lens component” is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components.

Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components. A "lens group" may also include one or more optical elements other than lens elements. For example, a lens group may include a stop that controls the amount of light that passes through the lens group.

The top portion of FIG. 1 shows the zoom lens at the wide-angle end of the zoom range and the bottom portion of FIG. 1 shows the zoom lens at the telephoto end of the zoom range. As shown in FIG. 1, the zoom lens is a three-group zoom lens that may include six lens elements and includes, arranged along the optical axis X in order from the object side, a first lens group $G_1$ of negative refractive power, a second lens group $G_2$ of positive refractive power, and a third lens group $G_3$ of positive refractive power. The second lens group $G_2$ includes a stop 2 that operates as an aperture stop to control the amount of light that passes through the zoom lens. In FIG. 1, a horizontal arrow before the label "Object side" points in one direction in order to indicate the object side of the zoom lens. The opposite side is the image side of the zoom lens. A filter unit or cover glass 1 is on the image side of the third lens group $G_3$. The filter unit may include a low-pass filter and/or an infrared cut-off filter for controlling the light flux to an image plane (not shown) where an image pickup element, such as a CCD, may be located.

During zooming from the wide-angle end to the telephoto end, as shown in FIG. 1, the first lens group $G_1$ and the second lens group $G_2$ both move to become closer together, and the second lens group $G_2$ and the third lens group $G_3$ become farther apart. In FIG. 1, a line that is concave toward the object side extends between the positions of the first lens group $G_1$ in the upper and lower portions of FIG. 1 in order to indicate the locus of points of movement of the first lens group $G_1$, as seen in the cross-sections that include the optical axis X, during zooming between the wide-angle end and the telephoto end. Similarly, a straight line between the positions of the second lens group $G_2$ in the upper and lower portions of FIG. 1 indicates the locus of points of movement of the second lens group $G_2$ toward the object side during zooming from the wide-angle end to the telephoto end. In the same manner, a straight line between the positions of the third lens group $G_3$ in the upper and lower portions of FIG. 1 indicates the locus of points of movement of the third lens group $G_3$, which in FIG. 1 is a vertical line in order to indicate that the third lens group $G_3$ remains stationary during zooming. However, the third lens group $G_3$ may also be movable. By this relative movement of the three lens groups $G_1$, $G_2$, and $G_3$ along the optical axis X, the focal length f of the zoom lens can be varied, and the light flux can be condensed efficiently on an image plane. Furthermore, when focusing is performed from infinity to the close focus side, the third lens group $G_3$ moves toward the object side.

The first lens group $G_1$ is formed of, in order from the object side, a first lens component that is a lens element $L_1$ of negative refractive power and a meniscus shape and a second lens component that is a lens element $L_2$ of positive refractive power and a meniscus shape.

Additionally, preferably in the zoom lens of the present invention, the first lens group $G_1$ includes at least one aspheric surface and the Equation (A) below that defines the shape of the aspheric surfaces includes both even-order and odd-order coefficients $A_i$ that are non-zero:

$$Z=[(C\cdot Y^2)/\{1+(1-K\cdot C^2\cdot Y^2)^{1/2}\}]+\Sigma(A_i\cdot|Y^i|) \qquad \text{Equation }(A)$$

where

Z is the length (in mm) of a line drawn from a point on the aspheric lens surface at a distance Y from the optical axis to the tangential plane of the aspheric surface vertex, C is the curvature (equals 1 divided by the radius of curvature, R) of the aspheric lens surface on the optical axis), Y is the distance (in mm) from the optical axis, K is the eccentricity, and $A_i$ is the ith-order aspheric coefficient, and the summation extends over i.

In the two disclosed embodiments of the present invention described below, for the aspheric surfaces of the First lens element $L_1$, aspheric coefficients $A_3$–$A_{10}$ are non-zero and all other aspheric coefficients of the first lens element $L_1$ are zero.

Conventionally, in the use of Equation (A) above, only the even numbered aspheric coefficients $A_4$, $A_6$, $A_8$, and $A_{10}$ have been made non-zero in order to achieve the desired performance of a zoom lens. In addition, increasing the number of the non-zero aspheric terms with higher numbered non-zero aspheric coefficients has proved to be unrealistic by complicating optical design software and lens processing programming too much in view of computer performance capabilities.

However, in order to satisfy the demand for higher resolution lenses, the present invention takes advantage of improved computer performance of recent years and includes non-zero aspheric coefficients of odd-order terms. Because the number of parameters used to determine the aspheric shape increases, it becomes possible to determine the shape of the central region containing the optical axis of an aspheric lens surface and the peripheral region of the aspheric surface independently to some extent. Furthermore, by using a non-zero third-order aspheric coefficient $A_3$ in order to provide a third-order non-zero term, which is an odd-order term, in Equation (A), the rate of change of curvature in the vicinity of the optical axis can be increased.

In general, in a zoom lens that has a three-group construction, because an aspheric lens element arranged within the first lens group $G_1$ has the luminous flux spread out over the center portion and peripheral portion of the aspheric, surface of the lens element, the lens element may be designed to refract the luminous flux in the peripheral portion so that image surface curvature and distortion associated with the peripheral portion are favorably corrected. Additionally, the configuration of the center portion of the aspheric lens surface, which contributes to spherical aberration, may be determined largely independently so that simultaneous excellent correction of spherical aberration, distortion, and image surface curvature can be achieved for both the center and peripheral portions of the image.

The greater the number of terms in Equation (A) above, the better the optical performance of the aspheric lens surface. However, the degree of difficulty of the design and the costs of processing and implementing the design become greater as the number of non-zero terms in Equation (A) increases. Thus, demands for better performance must be balanced against costs associated with providing such better performance. However, simply adding one term of the third-order associated with a non-zero coefficient $A_3$ (i.e., an odd-order term) to the fourth-order, sixth-order, eighth-order, and tenth-order terms (which are the terms of even-order having non-zero coefficients that are generally used in defining an aspheric surface), enables a reasonable improvement in the correction of spherical aberration due to its contribution to the shape of the center region of the aspheric surface.

Alternatively, in a zoom lens having a roughly similar construction to that described above with the first lens group $G_1$ including an aspheric surface, Equation (A) above that defines the aspheric surface shape may include a non-zero, even-order term of less than the sixteenth-order and another non-zero, even-order term of the sixteenth-order or higher instead of one or more non-zero, odd-order terms. This configuration may result in improved performance as compared to using one or more additional non-zero coefficients for odd-order terms. In other words, the configuration of the center portion of the aspheric surface that includes the optical axis and the configuration of the peripheral portion of the aspheric lens surface can be determined independently to some extent, and the configuration of the peripheral region can be made suitable for favorable correction of spherical aberration due to the presence of one or more comparatively higher-order, non-zero terms. At the same time, the configuration of the center portion can be made suitable for the favorable correction of spherical aberration due to the presence of one or more comparatively low-order, non-zero terms, thereby enabling the simultaneous, favorable correction of spherical aberration, distortion, and image surface curvature, similar to the use of non-zero, odd-order terms in Equation (A) above.

Furthermore, the two alternatives described above may be used together. That is, Equation (A) above that defines the aspheric surface shape may include one or more non-zero, even-order aspheric coefficients in addition to also including one or more non-zero, odd-order coefficients.

Additionally, in the present invention, lens surfaces of other lens groups, that is, lens groups $G_2$ and $G_3$ may also be aspheric surfaces with their shapes given by Equation (A) above. Furthermore, Equation (A) that describes these aspheric surfaces may include non-zero odd-order aspheric coefficients and/or non-zero aspheric coefficients of order sixteen or higher.

Additionally, in the zoom lens of the present invention, because (1) when zooming is performed from the wide-angle end to the telephoto end, the first lens group $G_1$ and the second lens group $G_2$ become closer together and the distance between the second lens group $G_2$ and the third lens group $G_3$ increases and (2) focusing is performed from the infinity end to a close focus by moving the third lens group $G_3$ toward the object side, the distance between the second lens group $G_2$ and the third lens group $G_3$ at the time of stowing the lens body in a retracted position can be reduced. Thus, compactness of the zoom lens in a retracted and stowed position can be achieved by shortening the overall length of the zoom lens.

Additionally, preferably the zoom lens of the present invention satisfies the following Conditions (1)–(6):

$$36.0<\theta_w<41.0 \qquad \text{Condition (1)}$$

$$\nu_{d1}-\nu_{d2}>20.5 \qquad \text{Condition (2)}$$

$$\nu_{dP}-\nu_{dN}>25 \qquad \text{Condition (3)}$$

$$0.01<D_A<0.30 \qquad \text{Condition (4)}$$

$$|R_{1P}-R_{2P}|/(R_{1P}+R_{2P})<0.3 \qquad \text{Condition (5)}$$

$$1.2<Fa/Fw<5.0 \qquad \text{Condition (6)}$$

where $\theta_w$ is the half-field angle of the zoom lens at the wide-angle end (i.e., the half-field angle of view at the maximum image height at the wide-angle end), $\nu_{d1}$ is the Abbe number at the d-line (587.6 nm) of the first lens element in order from the object side (i.e., lens element $L_1$ of the first lens group $G_1$), $\nu_{d2}$ is the Abbe number at the d-line (587.6 nm) of the second lens element, in order from the object side, (i.e., lens element $L_2$ of the first lens group $G_1$), $\nu dP$ is the Abbe number at the d-line (587.6 nm) of a biconvex lens element of the second lens group $G_2$, $\nu_{dN}$ is the Abbe number at the d-line (587.6 nm) of a biconcave lens element of the second lens group $G_2$, $D_A$ is the distance on the optical axis between the image-side surface of a cemented lens component and an adjacent object-side surface of a single-element lens component of the second lens group $G_2$, $R_{1P}$ is the radius of curvature on the optical axis of the image-side surface of the cemented lens component of the second lens group $G_2$, $R_{2P}$ is the radius of curvature on the optical axis of the object-side surface of the single-element lens component of the second lens group $G_2$, Fa is the focal length of a single-element lens component of the second lens group $G_2$, and Fw is the focal length of the zoom lens at the wide-angle end.

Condition (1) specifies a range of values at the wide-angle end of the zoom range for the wide-angle zoom lens of the present invention and is a condition that will be satisfied along with the other Conditions (2)–(6).

Satisfying Condition (2) in terms of the difference in Abbe numbers between the first and second lens elements of the first lens group $G_1$ helps control lateral color aberration that would otherwise be a problem at the wide-angle end. Especially, even in a thirty-five millimeter format camera having a wide-angle focal length of approximately twenty-eight millimeters to twenty-four millimeters, sufficient optical performance can be obtained.

Satisfying Condition (3) also helps control lateral color at the wide-angle end, as well as helps to assure sufficient correction of longitudinal chromatic aberration at the telephoto end.

By satisfying Condition (4), the length of the second lens group $G_2$ can be reduced, contributing to the compactness of the optical system.

By satisfying Condition (5), aberrations such as spherical aberration and coma can be corrected sufficiently even though the second lens group $G_2$ is made more compact.

By satisfying Condition (6), the quality of the manufactured lens components of the second lens group $G_2$ can be improved.

Accordingly, the wide-angle zoom lens of the present invention has the ability to correct various aberrations sufficiently even though the lens has a simple, six-lens-element construction and the overall length of the zoom lens in its stowed (i.e., retracted) position is short.

In Embodiments 1 and 2 of the invention disclosed below, all aspheric coefficients other than $A_3$–$A_{10}$ are zero. These two embodiments will now be individually described with further reference to the drawings.

Embodiment 1

In Embodiment 1, as shown in FIG. 1, the first lens group $G_1$ is formed of, in order from the object side, a first lens element $L_1$ of negative refractive power that is nearly piano-concave but with a meniscus shape and with a concave surface on the image side, and a second lens element $L_2$ of positive refractive power and a meniscus shape with its object-side surface being convex. Both surfaces of lens element $L_1$ are aspheric surfaces with the aspheric surface shapes expressed by Equation (A) above including both even-order and odd-order, non-zero terms due to both even-order and odd-order aspheric coefficients $A_i$ being non-zero.

The second lens group $G_2$ is formed of, in order from the object side, the stop 2, a lens component formed of, in order from the object side, a third lens element $L_3$ that is a biconvex lens element with its object-side surface having a greater curvature (i.e., a smaller radius of curvature) than its image-side surface and that is joined, such as by being cemented, to a fourth lens element $L_4$ that is a biconcave lens element with its image-side surface having a greater curvature than its object-side surface, and a fifth lens element $L_5$ of positive refractive power and a meniscus shape with its convex surface on the object side that forms a separate lens component of the second lens group $G_2$. Both surfaces of the fifth lens element $L_5$ are aspheric surfaces with aspheric surface shapes expressed by Equation (A) above including only even-order non-zero terms based on only even-order aspheric coefficients being non-zero.

The third lens group $G_3$ is formed of a sixth lens element $L_6$ of positive refractive power with its object-side surface being convex. Both surfaces of lens element $L_6$ are aspheric surfaces with aspheric surface shapes expressed by Equation (A) above including both even and odd-order non-zero terms based on both even and odd aspheric coefficients being-non-zero.

Embodiment 1 of the present invention is a three-group zoom lens that includes six lens elements with lens elements $L_1$, $L_5$, and $L_6$ having aspheric shapes defined as described above and that excellently corrects aberrations and enables forming a high resolution image. Additionally, the zoom lens of Embodiment 1 may be designed to have a reduced length in its retracted position.

Embodiment 1 includes the preferable feature of a lens element with aspheric surfaces with aspheric surface shapes expressed by Equation (A) above including both even and odd-order non-zero terms based on both even and odd-order aspheric coefficients being non-zero present in the first lens group $G_1$. Additionally, Embodiment 1 includes the preferable feature of such an aspheric lens element of the first lens group $G_1$ being substantially far from the stop 2. Because this arrangement allows for the luminous flux passing through the aspheric surfaces of this aspheric lens component to be well spread out among the center portion and the peripheral portion of the aspheric surfaces, this design is highly effective in simultaneously excellently correcting spherical aberration, distortion, and image surface curvature.

Table 1 below lists numerical values of lens data for Embodiment 1. Table 1 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 1. Listed in the bottom portion of Table 1 are the focal length f and the f-number $F_{NO}$ at the wide-angle and telephoto ends, and the maximum field angle 2ω at the wide-angle end and the telephoto end for Embodiment 1.

TABLE 1

| # | R | D | $N_d$ | $\nu_d$ |
|---|---|---|---|---|
| 1* | 196.8152 | 1.22 | 1.80348 | 40.4 |
| 2* | 4.9692 | 2.59 | | |
| 3 | 9.2770 | 2.33 | 1.92286 | 18.9 |
| 4 | 17.4383 | $D_4$ (variable) | | |
| 5 (stop) | ∞ | 0.40 | | |
| 6 | 5.4254 | 3.76 | 1.71300 | 53.8 |
| 7 | −51.9426 | 0.70 | 1.84666 | 23.8 |
| 8 | 4.4522 | 0.11 | | |
| 9* | 4.2683 | 2.06 | 1.68893 | 31.1 |
| 10* | 20.9393 | $D_{10}$ (variable) | | |
| 11* | 12.7985 | 1.66 | 1.56865 | 58.6 |
| 12* | −189.6443 | 3.12 | | |
| 13 | ∞ | 1.00 | 1.51680 | 64.2 |
| 14 | ∞ | | | |

f = 4.5–14.8 mm $F_{NO}$ = 2.8–5.2 2ω = 74.8°–24.8°

The lens surfaces with a * to the right of the surface number in Table 1 are aspheric lens surfaces, and the aspheric surface shape of these lens elements is expressed by Equation (A) above.

Table 2 below lists the values of the constant K and the coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0\times10^{-2}$.

TABLE 2

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.5588 | 7.2761E−4 | 1.1606E−3 | −3.6642E−4 | −1.8795E−5 | 2.6232E−5 | −4.9511E−6 | 3.9258E−7 | −1.1526E−8 |
| 2 | −2.5400 | 2.8736E−4 | 5.1903E−3 | −9.6874E−4 | −7.6141E−6 | 2.2983E−5 | 1.0817E−7 | −6.4849E−7 | 5.3594E−8 |
| 9 | −1.7800 | 0 | 3.7223E−3 | 0 | −1.1003E−4 | 0 | 1.4793E−6 | 0 | −3.3948E−7 |
| 10 | −4.9331E−1 | 0 | 1.8897E−3 | 0 | 6.1424E−5 | 0 | −1.1559E−7 | 0 | −2.4368E−7 |
| 11 | 6.9188E−1 | −2.8747E−4 | 4.4261E−4 | −5.8351E−5 | 5.9957E−5 | −4.7091E−7 | −6.0427E−7 | 4.9554E−9 | 4.4525E−8 |
| 12 | −1.4868E−1 | 1.2958E−3 | −3.6363E−4 | 2.9900E−4 | 2.9670E−6 | −8.5937E−7 | 2.0894E−6 | 4.2969E−8 | −4.8841E−9 |

In the zoom lens of Embodiment 1, the first lens group $G_1$ and the second lens group $G_2$ move during zooming. Therefore, the on-axis spacing $D_4$ between lens groups $G_1$ and $G_2$ and the on-axis spacing $D_{10}$ between lens groups $G_2$ and $G_3$ change with zooming. Table 3 below lists the values of the focal length f, the on-axis surface spacing $D_4$, and the on-axis surface spacing $D_{10}$ at the wide-angle end (f=4.5 mm), at an intermediate zoom position (f=7.8 mm), and at the telephoto end (f=14.8 mm).

TABLE 3

| f | $D_4$ | $D_{10}$ |
|---|---|---|
| 4.5 | 16.93 | 5.18 |
| 7.8 | 8.38 | 9.50 |
| 14.8 | 3.02 | 18.40 |

The zoom lens of Embodiment 1 of the present invention satisfies Conditions (1)–(6) above as set forth in Table 4 below.

TABLE 4

| Condition No. | Condition | Value |
|---|---|---|
| (1) | $36.0 < \theta_w < 41.0$ | 37.4 |
| (2) | $\nu_{d1} - \nu_{d2} > 20.5$ | 21.5 |
| (3) | $\nu_{dP} - \nu_{dN} > 25$ | 30.0 |
| (4) | $0.01 < D_A < 0.30$ | 0.11 |
| (5) | $\lvert R_{1P} - R_{2P}\rvert/(R_{1P} + R_{2P}) < 0.3$ | 0.02 |
| (6) | $1.2 < Fa/Fw < 5.0$ | 1.65 |

Figure 2A:
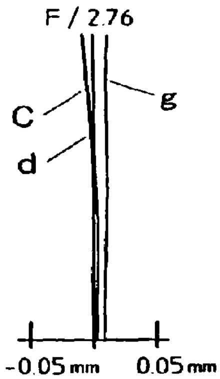
FIGS. 2A–2D show the spherical aberration, astigmatism, distortion, and lateral color, respectively, of the zoom lens according to Embodiment 1 at the wide-angle end.
Figure 2B:
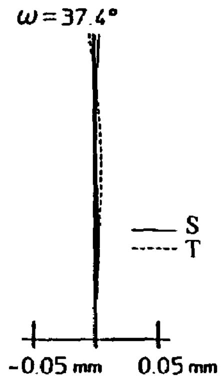
Figure 2C:
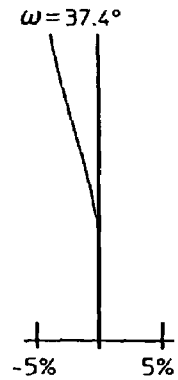
Figure 2D:
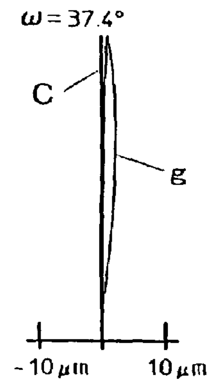
Figure 2E:
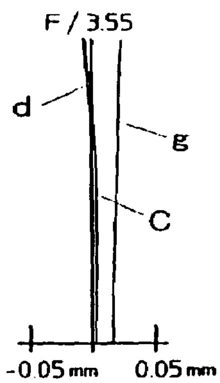
FIGS. 2E–2H show the spherical aberration, astigmatism, distortion, and lateral color, respectively, of the zoom lens according to Embodiment 1 at an intermediate position.
Figure 2F:
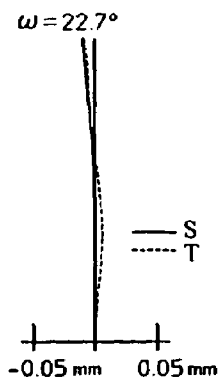
Figure 2G:
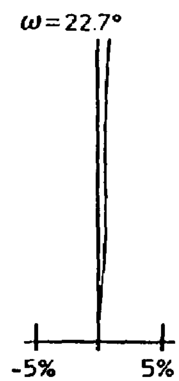
Figure 2H:
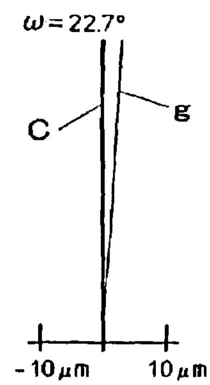
Figure 2I:
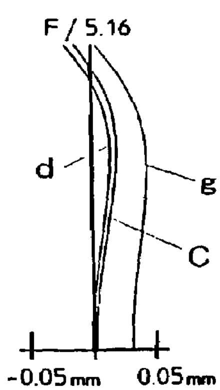
FIGS. 2I–2L show the spherical aberration, astigmatism, distortion, and lateral color, respectively, of the zoom lens according to Embodiment 1 at the telephoto end.
Figure 2J:
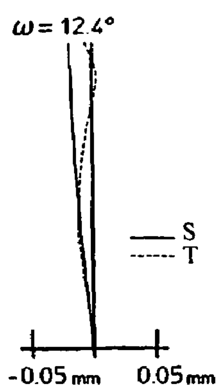
Figure 2K:
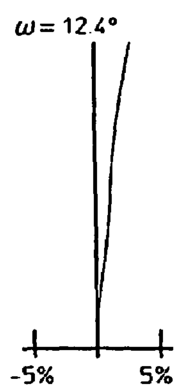
Figure 2L:
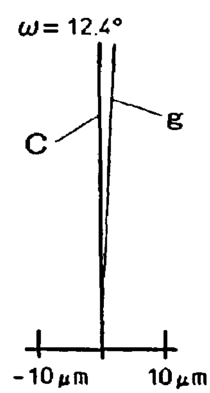

FIGS. 2A–2D show the spherical aberration, astigmatism, distortion, and lateral color, respectively, of the zoom lens of Embodiment 1 at the wide-angle end. FIGS. 2E–2H show the spherical aberration, astigmatism, distortion, and lateral color, respectively, of the zoom lens of Embodiment 1 at an intermediate position, and FIGS. 2I–2L show the spherical aberration, astigmatism, distortion, and lateral color, respectively, of the zoom lens of Embodiment 1 at the telephoto end. In FIGS. 2A, 2E, and 2I, the spherical aberration is shown for the wavelengths 587.6 nm (the d-line), 656.3 nm (the C-line), and 435.8 nm (the g-line). In the remaining figures, ω is the half-field angle. In FIGS. 2B, 2F and 2J, the astigmatism is shown for the sagittal image surface S and the tangential image surface T. In FIGS. 2C, 2G and 2K, distortion is measured at 587.6 nm (the d-line). In FIGS. 2D, 2H and 2L, the lateral color is shown for the wavelengths 656.3 nm (the C-line) and 435.8 nm (the g-line) relative to 587.6 nm (the d-line). As is apparent from these figures, the various aberrations are favorably corrected over the entire range of zoom.

explained. Embodiment 2 differs from Embodiment 1 in that in Embodiment 2, the sixth lens element $L_6$ is a meniscus lens element with its convex surface on the image side. Also, Embodiment 2 differs from Embodiment 1 in its lens element configuration by different radii of curvature of lens surfaces, different aspheric coefficients of the aspheric lens surfaces, different optical element surface spacings, and one different refractive material.

Table 5 below lists numerical values of lens data for Embodiment 2. Table 5 lists the surface number #, in order from the object side, the radius of curvature R (in mm) of each surface on the optical axis, the on-axis surface spacing D (in mm) between surfaces, as well as the refractive index $N_d$ and the Abbe number $\nu_d$ (at the d-line of 587.6 nm) of each optical element for Embodiment 2. Listed in the bottom portion of Table 5 are the focal length f and the f-number $F_{NO}$ at the wide-angle and telephoto ends, and the maximum field angle 2ω at the wide-angle end and the telephoto end for Embodiment 2.

TABLE 5

| # | R | D | $N_d$ | $\nu_d$ |
|---|---|---|---|---|
| 1* | 5105.9700 | 1.630 | 1.80348 | 40.4 |
| 2* | 7.2341 | 3.800 | | |
| 3 | 13.0616 | 3.110 | 1.92286 | 18.9 |
| 4 | 23.7108 | $D_4$ (variable) | | |
| 5 (stop) | ∞ | 0.580 | | |
| 6 | 8.4581 | 5.670 | 1.71300 | 53.8 |
| 7 | −35.2321 | 1.020 | 1.84666 | 23.8 |
| 8 | 8.8613 | 0.155 | | |
| 9* | 8.2876 | 3.880 | 1.68893 | 31.1 |
| 10* | 37.6498 | $D_{10}$ (variable) | | |
| 11* | −99.2157 | 2.320 | 1.51680 | 64.2 |
| 12* | −14.2730 | 6.010 | | |
| 13 | ∞ | 1.000 | 1.51680 | 64.2 |
| 14 | ∞ | | | |
| f = 6.6–24.2 mm $F_{NO}$ = 2.9–5.8 2ω = 75.6°–22.2° | | | | |

The lens surfaces with a * to the right of the surface number in Table 5 are aspheric lens surfaces, and the aspheric surface shape of these lens elements is expressed by Equation (A) above.

Table 6 below lists the values of the constant K and the coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0\times10^{-2}$.

TABLE 6

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | −1.5601 | 1.7943E−5 | 5.4813E−4 | −1.0746E−4 | −3.8610E−6 | 3.1247E−6 | −3.3770E−7 | 1.3013E−8 | −9.1717E−11 |
| 2 | −2.2093E−1 | −4.2011E−5 | 9.2119E−4 | −1.4507E−4 | −2.6578E−6 | 2.5815E−6 | −1.4281E−9 | −3.3589E−8 | 1.9861E−9 |
| 9 | −3.4652 | 0 | 7.8030E−4 | 0 | −1.9405E−5 | 0 | 1.4712E−7 | 0 | −1.1524E−8 |
| 10 | −4.3809E−1 | 0 | 4.9575E−4 | 0 | 5.5959E−6 | 0 | −4.3438E−8 | 0 | −8.4156E−9 |
| 11 | 1.0244 | −5.0064E−4 | 1.3167E−4 | −5.7707E−5 | 8.2414E−6 | 7.1311E−8 | −4.1044E−8 | −7.4509E−10 | 1.3686E−9 |
| 12 | 1.4509 | −1.5774E−4 | 1.0006E−4 | 2.4604E−6 | −3.5696E−7 | −2.3200E−7 | 1.2663E−7 | 3.3138E−10 | −2.8194E−10 |

Embodiment 2

Figure 3:
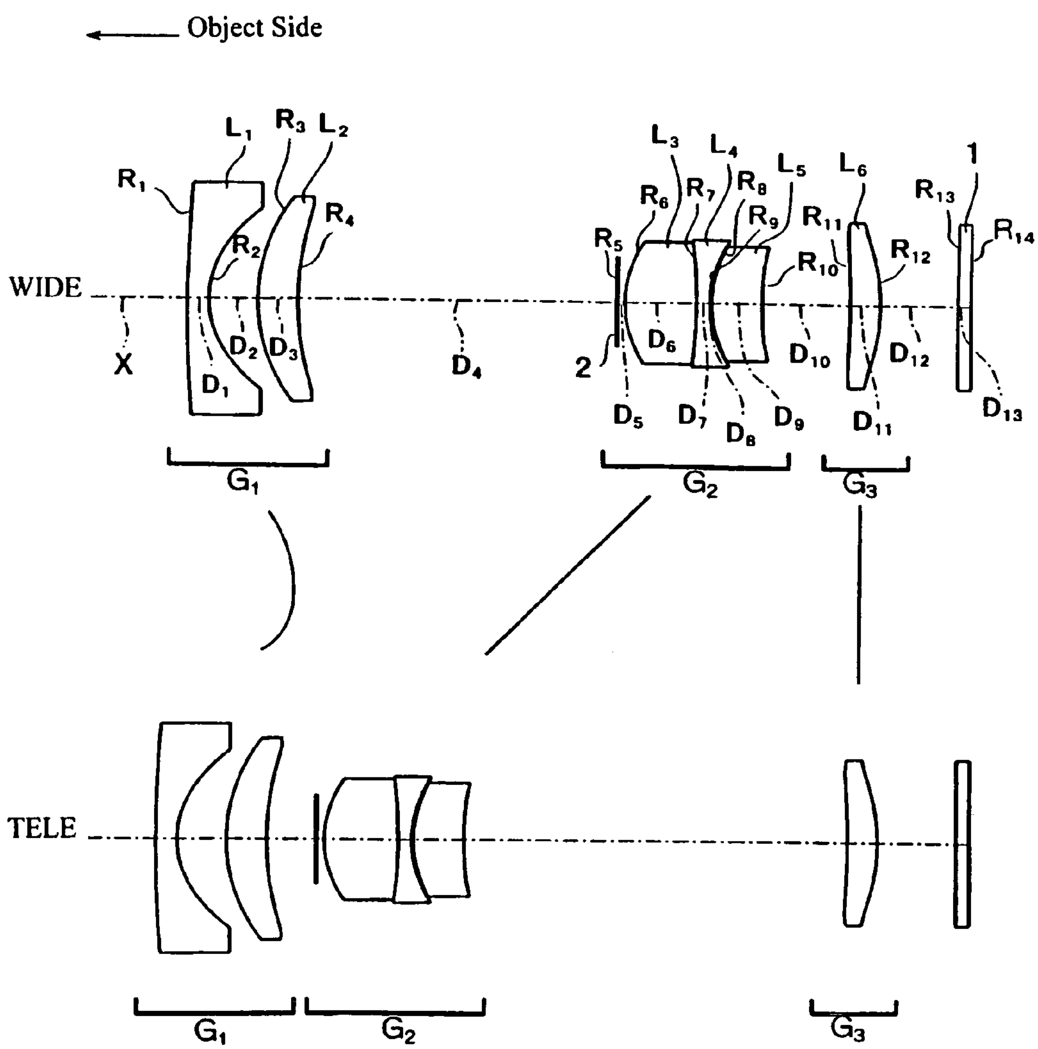
FIG. 3 shows cross-sectional views of the zoom lens according to Embodiment 2 at the wide-angle end (WIDE) and at the telephoto end (TELE)

Embodiment 2 is shown in FIG. 3. Embodiment 2 is similar to Embodiment 1 and therefore only the differences between Embodiment 2 and Embodiment 1 will be In the zoom lens of Embodiment 2, the first lens group $G_1$ and the second lens group $G_2$ move during zooming. Therefore, the on-axis spacing $D_4$ between lens groups $G_1$ and $G_2$ and the on-axis spacing $D_{10}$ between lens groups $G_2$ and $G_3$ change with zooming. Table 7 below lists the values of the focal length f, the on-axis surface spacing $D_4$, and the on-axis surface spacing $D_{10}$ at the wide-angle end (f=6.6 mm), at an intermediate zoom position (f=12.5 mm), and at the telephoto end (f=24.2 mm).

TABLE 7

| f | $D_4$ | $D_{10}$ |
|---|---|---|
| 6.6 | 24.63 | 6.73 |
| 12.5 | 11.07 | 14.48 |
| 24.2 | 3.81 | 29.71 |

The zoom lens of Embodiment 2 of the present invention satisfies Conditions (1)–(6) above as set forth in Table 8 below.

TABLE 8

| Condition No. | Condition | Value |
|---|---|---|
| (1) | $36.0 < \theta_w < 41.0$ | 37.8 |
| (2) | $\nu_{d1} - \nu_{d2} > 20.5$ | 21.5 |
| (3) | $\nu_{dP} - \nu_{dN} > 25$ | 30.0 |
| (4) | $0.01 < D_A < 0.30$ | 0.155 |
| (5) | $\lvert R_{1P} - R_{2P}\rvert/(R_{1P} + R_{2P}) < 0.3$ | 0.03 |
| (6) | $1.2 < Fa/Fw < 5.0$ | 2.22 |

Figure 4A:
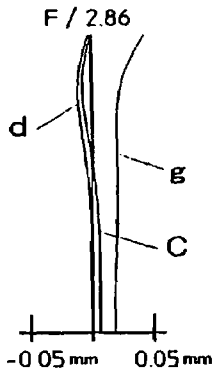
FIGS. 4A–4D show the spherical aberration, astigmatism, distortion, and lateral color, respectively, of the zoom lens according to Embodiment 2 at the wide-angle end.
Figure 4B:
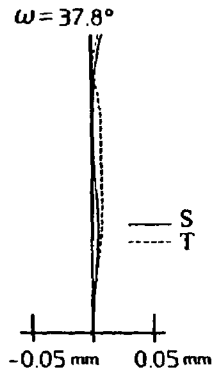
Figure 4C:
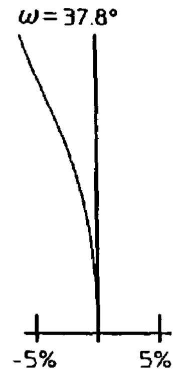
Figure 4D:
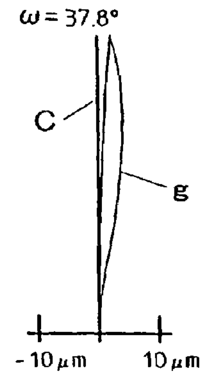
Figure 4E:
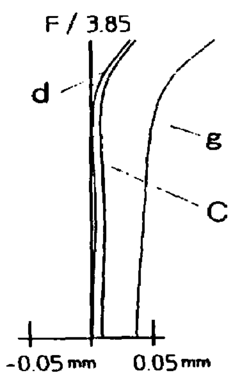
FIGS. 4E–4H show the spherical aberration, astigmatism, distortion, and lateral color, respectively, of the zoom lens according to Embodiment 2 at an intermediate position.
Figure 4F:
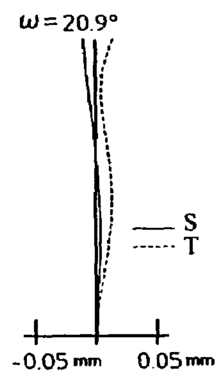
Figure 4G:
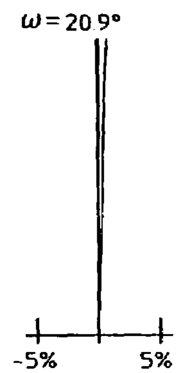
Figure 4H:
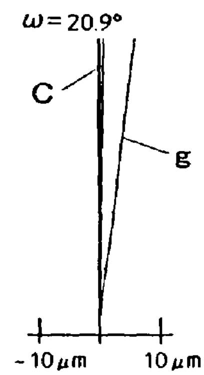
Figure 4I:
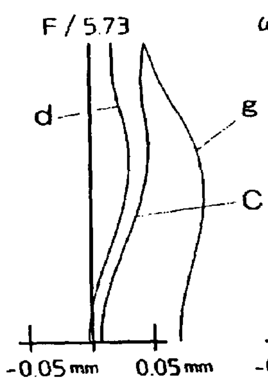
FIGS. 4I–4L show the spherical aberration, astigmatism, distortion, and lateral color, respectively, of the zoom lens according to Embodiment 2 at the telephoto end.
Figure 4J:
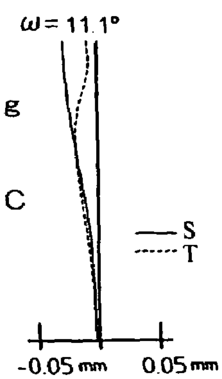
Figure 4K:
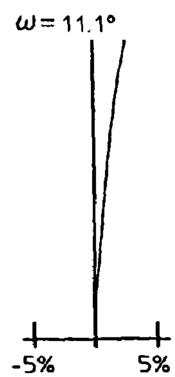
Figure 4L:
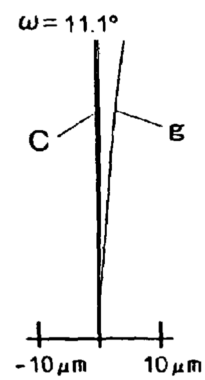

FIGS. 4A–4D show the spherical aberration, astigmatism, distortion, and lateral color, respectively, of the zoom lens of Embodiment 2 at the wide-angle end. FIGS. 4E–4H show the spherical aberration, astigmatism, distortion, and lateral color, respectively, of the zoom lens of Embodiment 2 at an intermediate position, and FIGS. 4I–4L show the spherical aberration, astigmatism, distortion, and lateral color, respectively, of the zoom lens of Embodiment 2 at the telephoto end. In FIGS. 4A, 4E, and 4I, the spherical aberration is shown for the wavelengths 587.6 nm (the d-line), 656.3 nm (the C-line), and 435.8 nm (the g-line). In the remaining figures, ω is the half-field angle. In FIGS. 4B, 4F and 4J, the astigmatism is shown for the sagittal image surface S and the tangential image surface T. In FIGS. 4C, 4G and 4K, distortion is measured at 587.6 nm (the d-line). In FIGS. 4D, 4H and 4L, the lateral color is shown for the wavelengths 656.3 nm (the C-line) and 435.8 nm (the g-line) relative to 587.6 nm (the d-line). As is apparent from these figures, the various aberrations are favorably corrected over the entire range of zoom.

The present invention is not limited to the aforementioned embodiments, as it will be obvious that various alternative implementations are possible. For instance, values such as the radius of curvature R of each of the lens components, the shapes of the aspheric lens surfaces, the surface spacings D, the refractive indices $N_d$, and Abbe number $\nu_d$ of lens elements are not limited to those indicated in each of the aforementioned embodiments, as other values can be adopted. Additionally, the present invention may be used in other than a three-group zoom lens, such as with four or more groups. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged on an optical axis in order from the object side as follows:

a first lens group of negative refractive power;

a second lens group of positive refractive power and that includes a stop for controlling the amount of light that passes through the zoom lens; and a third lens group of positive refractive power; wherein the first and the second lens groups are moved so that the first and second lens groups become closer together during zooming from the wide-angle end to the telephoto end;

the second and third lens groups are moved relatively so that the second and third lens groups become farther apart during zooming from the wide-angle end to the telephoto end;

the third lens group is moved toward the object side during focusing from infinity to a close focus;

the first lens group includes, arranged on the optical axis in order from the object side, a first lens element of negative refractive power and a second lens element of positive refractive power, and at least one of said first lens element and said second lens element includes at least one aspheric lens surface;

the shape of said at least one aspheric lens surface is given by an aspheric lens equation that includes at least one non-zero coefficient of an even power of Y, and at least one non-zero coefficient of an odd power of Y, where Y is the distance of a point on the aspheric lens surface from the optical axis;

and the following conditions are satisfied:

$$36.0<\theta_w<41.0$$

$$\nu_{d1}-\nu_{d2}>20.5$$

where $\theta_w$ is the half-field angle of the zoom lens at the wide-angle end, $\nu_{d1}$ is the Abbe number at the d-line of said first lens element, and $\nu_{d2}$ is the Abbe number at the d-line of said second lens element.

2. The zoom lens of claim 1, wherein the first lens group, the second lens group, and the third lens group are arranged along the optical axis without any intervening lens element.

3. The zoom lens of claim 1, wherein the zoom lens includes only three lens groups.

4. The zoom lens of claim 1, wherein the zoom lens includes only five lens components.

5. The zoom lens of claim 4, wherein the zoom lens includes only six lens elements.

6. The zoom lens of claim 2, wherein the zoom lens includes only five lens components.

7. The zoom lens of claim 6, wherein the zoom lens includes only six lens elements.

8. The zoom lens of claim 3, wherein the zoom lens includes only five lens components.

9. The zoom lens of claim 8, wherein the zoom lens includes only six lens elements.

10. The zoom lens of claim 3, wherein the zoom lens includes only six lens elements.

11. The zoom lens of claim 1, wherein:

said first lens element has a meniscus shape with its image-side surface being concave;

said second lens element has a meniscus shape with its object-side surface being convex;

the second lens group includes only two lens components, an object-side lens component that includes only a biconvex lens element and a biconcave lens element and an image-side lens component that includes only one lens element, is of positive refractive power, and has a meniscus shape with its object-side surface being convex;

the third lens group is formed of a single lens element of positive refractive power;

each of said only one lens element and said single lens element includes at least one aspheric surface; and the following conditions are satisfied:

$$\nu_{dP}-\nu_{dN}>25$$

$$0.01<D_A<0.30$$

$$|R_{1P}-R_{2P}|/(R_{1P}+R_{2P})<0.3$$

$$1.2<Fa/Fw<5.0$$

where $\nu_{dP}$ is the Abbe number at the d-line of said biconvex lens element, $\nu_{dN}$ is the Abbe number at the d-line of said biconcave lens element, $D_A$ is the distance on the optical axis between said object-side lens component and said image-side lens component, $R_{1P}$ is the radius of curvature on the optical axis of the image-side surface of said object-side lens component, $R_{2P}$ is the radius of curvature on the optical axis of the object-side surface of said image-side lens component, Fa is the focal length of said image-side lens component, and Fw is the focal length of the zoom lens at the wide-angle end.

12. The zoom lens of claim 11, wherein the first lens group, the second lens group, and the third lens group are arranged along the optical axis without any intervening lens element.

13. The zoom lens of claim 11, wherein the zoom lens includes only three lens groups.

14. The zoom lens of claim 11, wherein the zoom lens includes only five lens components.

15. The zoom lens of claim 14, wherein the zoom lens includes only six lens elements.

16. The zoom lens of claim 12, wherein the zoom lens includes only five lens components.

17. The zoom lens of claim 16, wherein the zoom lens includes only six lens elements.

18. The zoom lens of claim 13, wherein the zoom lens includes only five lens components.

19. The zoom lens of claim 18, wherein the zoom lens includes only six lens elements.

20. The zoom lens of claim 13, wherein the zoom lens includes only six lens elements.

* * * * *